United States Patent [19]

Simkhovich

[11] Patent Number: 5,222,841
[45] Date of Patent: Jun. 29, 1993

[54] FORM TOOL SYSTEM

[75] Inventor: Boris E. Simkhovich, St. Paul, Minn.

[73] Assignee: Graco Inc., Minneapolis, Minn.

[21] Appl. No.: 974,679

[22] Filed: Nov. 12, 1992

Related U.S. Application Data

[63] Continuation of Ser. No. 657,112, Feb. 15, 1991, abandoned.

[51] Int. Cl.[5] .................. B23B 27/16; B23B 27/22
[52] U.S. Cl. .......................... 407/5; 407/66; 407/99
[58] Field of Search ........................ 407/2-6, 407/66, 70, 72, 77-79, 82, 85, 86, 95, 96, 99, 100, 102, 107, 101

[56] References Cited

U.S. PATENT DOCUMENTS

| | | | |
|---|---|---|---|
| 1,522,587 | 1/1925 | Hallstrom . | |
| 1,700,610 | 1/1929 | Drees | 407/86 |
| 2,034,453 | 3/1936 | Wiener | 407/70 X |
| 2,063,128 | 12/1936 | Severson | 407/96 |
| 2,854,734 | 10/1958 | Beck | 407/107 X |
| 2,992,472 | 7/1961 | Paul | 29/96 |
| 3,060,554 | 10/1962 | Kirchner | 407/107 X |
| 3,136,031 | 6/1964 | Cassidy | 29/97 |
| 3,246,382 | 4/1966 | Zierden | 407/107 |
| 3,371,567 | 3/1968 | Davis | 82/36 |
| 3,484,920 | 12/1969 | Werner | 407/107 X |
| 3,694,879 | 10/1972 | Kennicott et al. | 29/96 |
| 3,844,008 | 10/1974 | Sletten | 29/96 |
| 4,050,127 | 9/1977 | Bodem et al. | 407/107 |
| 4,077,735 | 3/1978 | Dick et al. | 407/4 X |
| 4,174,916 | 11/1979 | Kezran | 407/108 |
| 4,189,264 | 2/1980 | Kraemer | 407/2 |
| 4,600,341 | 7/1986 | Board | 407/99 |
| 4,979,849 | 12/1990 | Kezran | 407/107 |

Primary Examiner—Steven C. Bishop

[57] ABSTRACT

A system is provided for a set of form tools which utilize a common shank to be able to machine a number of different shapes. A pad is provided which sits between the cutting tool and the shank where the pad is of such a shape and dimension as to provide support for the cutting member, the shank being merely a mounting device. The cutting member and pad may be wider or narrower than the shank and may either extend forward of the shank or behind the forward edge of the shank.

13 Claims, 4 Drawing Sheets 5,222,841

FORM TOOL SYSTEM

This application is a continuation of application Ser. No. 657,112, filed on Feb. 15, 1991, now abandoned.

BACKGROUND OF THE INVENTION

Form tools are used in machining to cut a particular form or profile into a rotating part as contrasted to traditional single point tools which may be cheaper but require more machining time.

In conventional brazed form tools, a steel blank has a small piece of carbide brazed onto one end as a cutting tool. Such tools, while relatively inexpensive, may be used one time only and not easily sharpened or otherwise renewed. In such products, the shape of the shank and cutting member are generally the same.

In a variation of the conventional form tool called a clamp type form tool, a removable cutting member is clamped to a shank with a small shim between the two parts which serves to protect the shank. The cross section and relief angles presented to the piece being machined are generally the same on all three of the aforementioned parts and the shape is only good for one part, that is, the shape may not be interchanged on such traditional devices.

SUMMARY OF THE INVENTION

It is therefore an object of this invention to provide a system of form tools which is capable of repeated use and which allows a high degree of interchangeability so as to reduce the number of total parts required to accomplish a given number of tasks.

It is further an object of this invention to provide a form tool system which provides increased flexibility in machining such as for instance the need to no longer provide a relief angle.

The instant invention is comprised of a generally standard sized shank which has clamped to it, a cutting member and a supporting pad, the pad being generally the same shape and profile as the cutting member and having a thickness sufficient to support the cutting member. By doing so, the shank becomes no more than a means of locating the pad and the cutting member in the machine tool such as to allow a few standardized sized shanks to be used with a multiplicity of various form tools which may be renewed or remanufactured at relatively inexpensive prices.

The instant invention also allows enhanced flexibility in the depth and shape of the part produced when used in conjunction with a standard shank. Most notably, parts can now be produced where the part being machined actually sits "in" the shank. The pad may be produced with a straight edge perpendicular to the surface of the shank rather than using a relief angle.

Also, numerical control machines have typically not used form tools to date. It should be recognized that the inventive concept of the instant invention allows what is referred to as the shank to be most anything. This in fact can be the tool bearing member on a CNC machine or the like, that is, it can be screwed directly to the machine rather to an intermediate shank which in turn is placed in a standard tool holder. The instant invention is also suited for use with shave tools, boring bars, recess tools and knee tools.

It is also recognized that because of the flexibility and placement that the clamping mechanism may be used as a chip breaker to provide further efficient use of the product.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

DESCRIPTION OF THE PREFERRED EMBODIMENT

Figure 1:
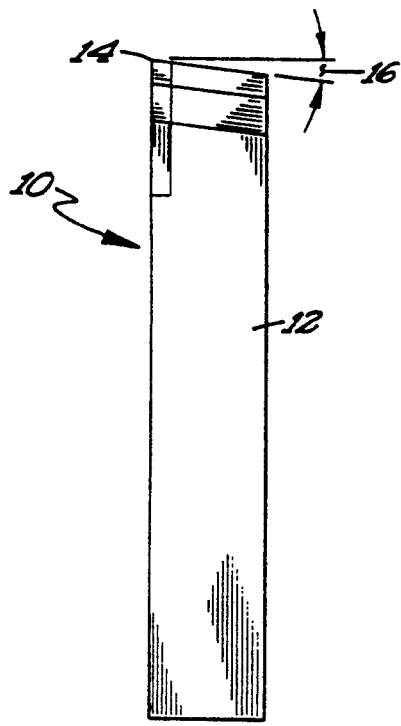
FIG. 1 shows a side view of the prior art one use form tool.
Figure 2:
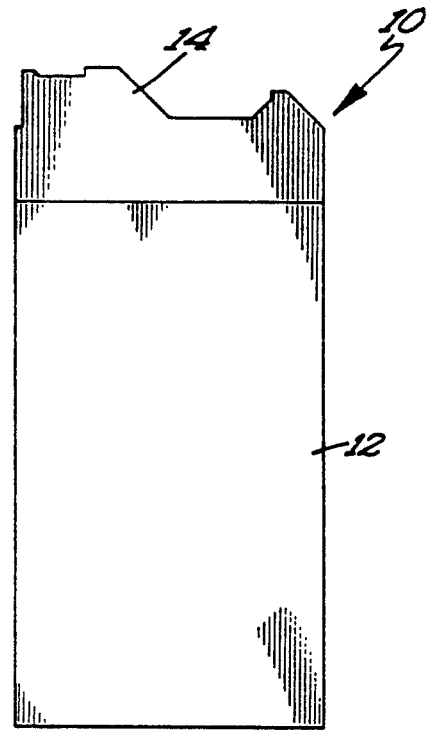
FIG. 2 shows a top view of the FIG. 1 prior art.

FIGS. 1 and 2 shows a prior art brazed form tool generally designated 10 which is comprised of a shank 12 and a cutting member 14 brazed to shank 12. Notice that both shank 12 and cutting member 14 have a relief angle 16. Note in FIG. 2 that the width of the cutting member 14 and shank 12 are exactly the same.

Figure 3:
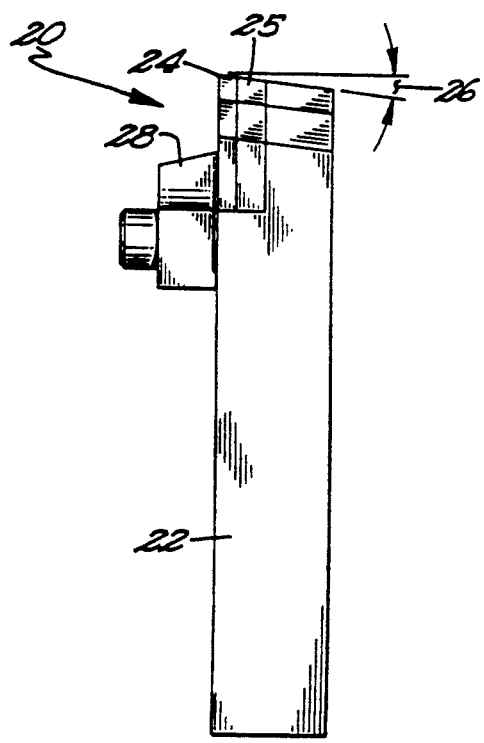
FIG. 3 is a side view of another prior art device having a replaceable cutting member.
Figure 4:
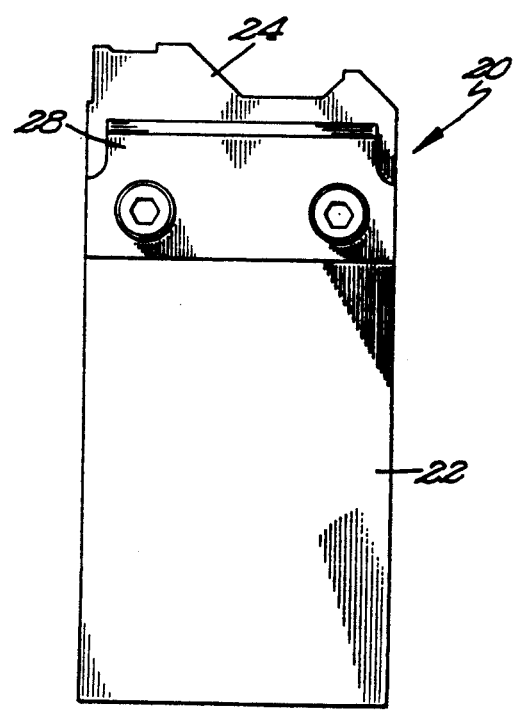
FIG. 4 is a top view of the FIG. 3 prior art.

FIGS. 3 and 4 show a slightly more adaptable prior art variation 20 of the FIGS. 1 and 2 embodiment wherein a shank 22 has a cutting member 24 thereon and sandwiched between cutting member 24 and shank 22 is shim 25. Note also that all three parts mentioned above have a relief angle 26 thereunder. A clamping mechanism 28 is provided to hold down cutting member 24 and shim 25 to shank 22. Similarly, like FIG. 2, FIG. 4 shows that shank 22, cutting member 24 and shim 25 are all of the same width.

Note that shim 25 exists only to protect shank 22 and performs no real support function. Such shims typically have a thickness of approximately ⅛ of an inch which is not sufficient to provide any appreciable support, that function being performed by shank 22.

Figure 5:
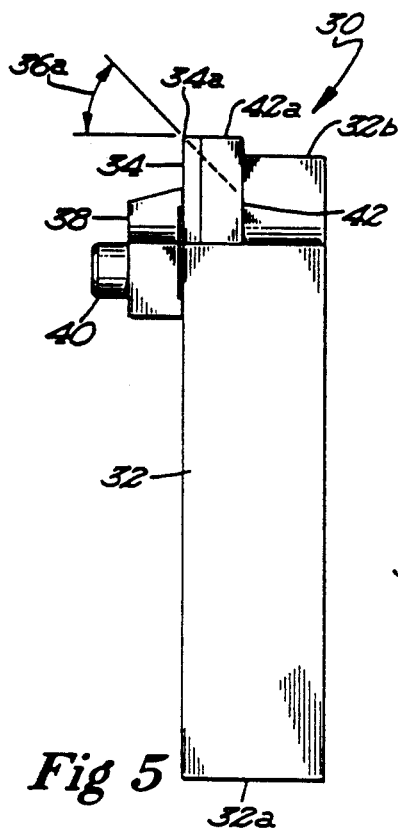
FIG. 5 is a side view of the form tool system of the instant invention.
Figure 6:
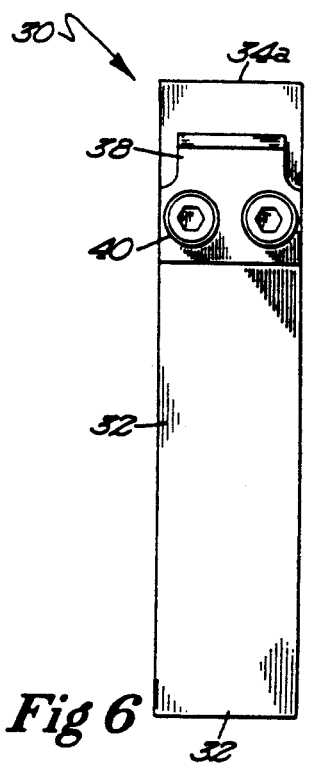
FIG. 6 is a top view of the instant invention.
Figure 7:
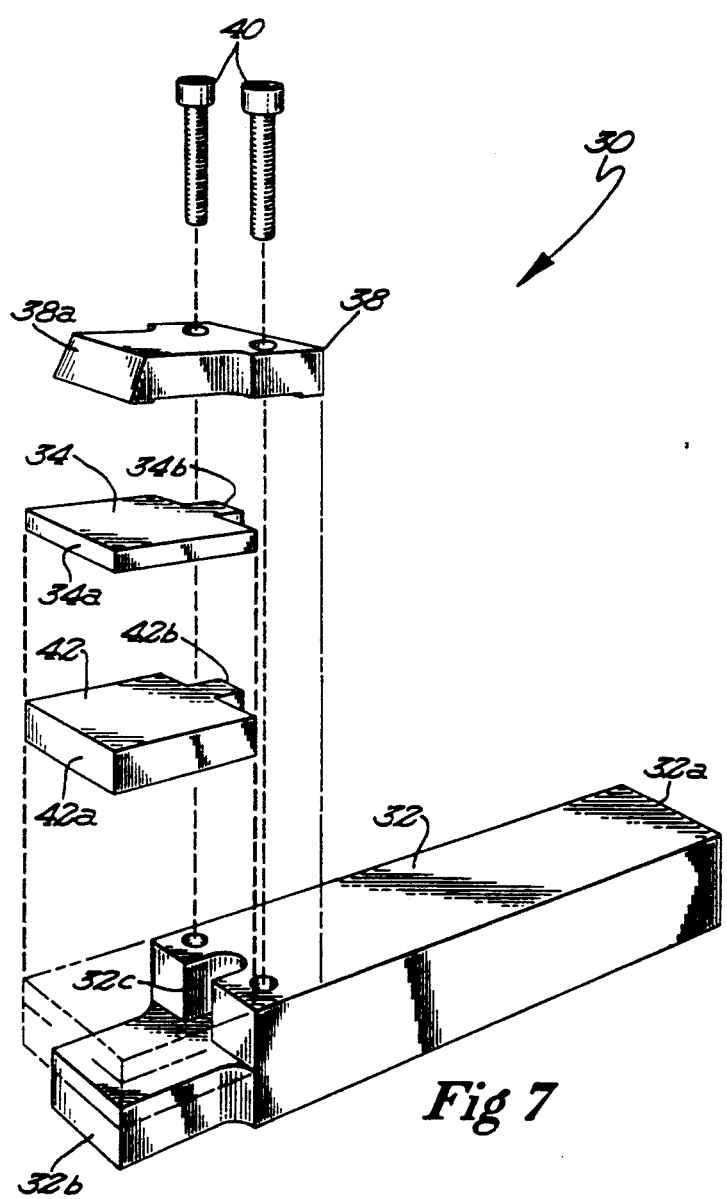
FIG. 7 shows a perspective view of the instant invention.

The remaining drawing figures show the instant invention. FIGS. 5-7 show a basic version 30 wherein shank 32 having a mounting end 32a and a distal end 32b supports a pad 42 having a distal end 42a and a cutting member 34 having cutting edge 34a. Note the thickness of pad 42 is such as to be able to provide all the support needed by cutting member 34 such that there merely need be enough of shank 32 overlapped in order to physically locate the combination of parts.

Tabs 34b and 42b are provided on the inner ends of cutting member 34 and pad 42 respectively and fit into slot 32c in shank 32. These mounting tabs help assist in positively locating the various parts in an exact relationship so as to allow quick interchange of parts without extensive setup time.

A clamping member 38 clamps cutting member 34 and pad 42 by means of bolt 40 to shank 32. Note that the front end 38a of clamping member 38 functions as a chip breaker.

Figure 8:
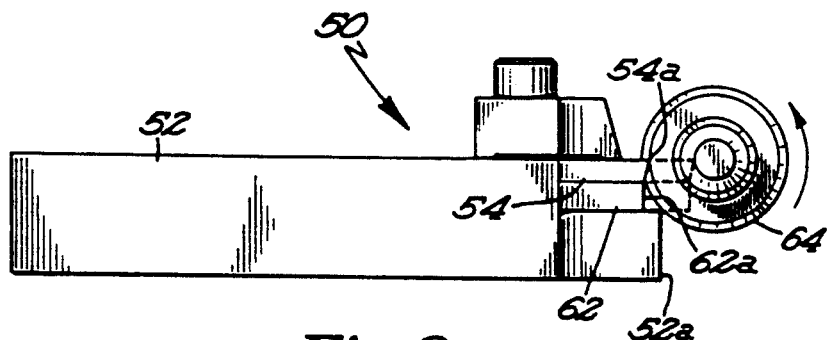
FIG. 8 shows a side view of the form tool system of the instant invention cutting a part.
Figure 9:
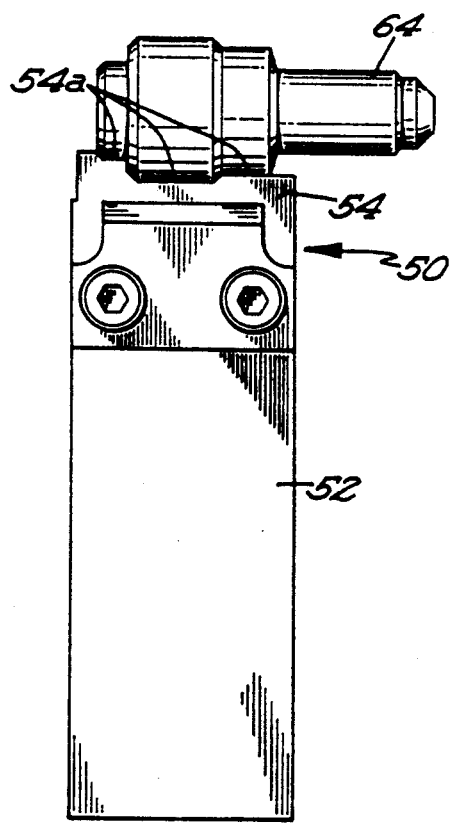
FIG. 9 shows a top view of the form tool system of the instant invention cutting a part.
Figure 10:
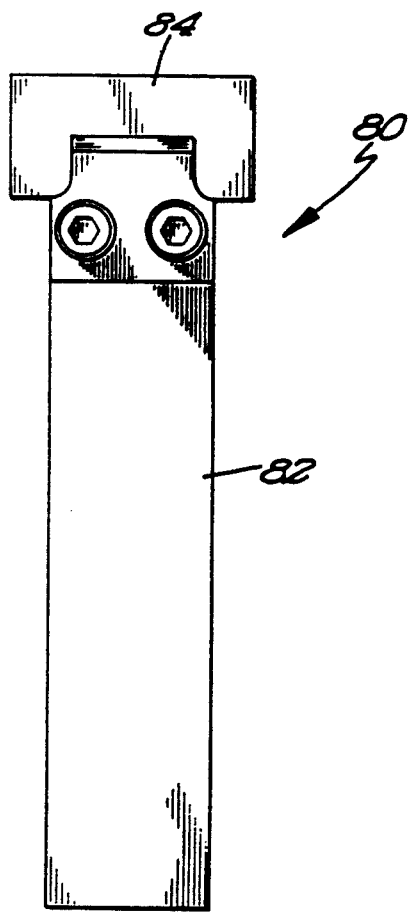
FIG. 10 is a top view of a variation of the instant invention.
Figure 11:
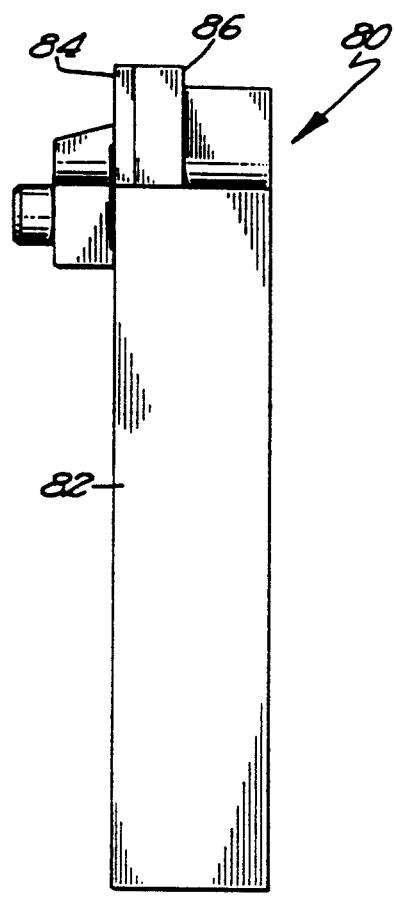
FIG. 11 is a side view of a variation of the instant invention.
Figure 12:
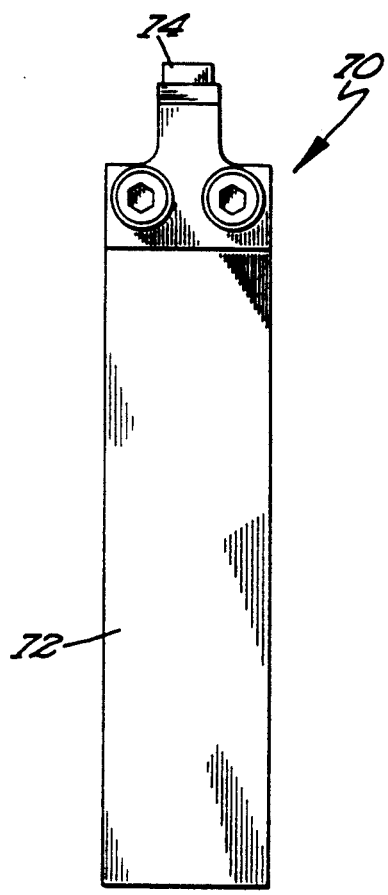
FIG. 12 is a top view of another variation of the instant invention.
Figure 13:
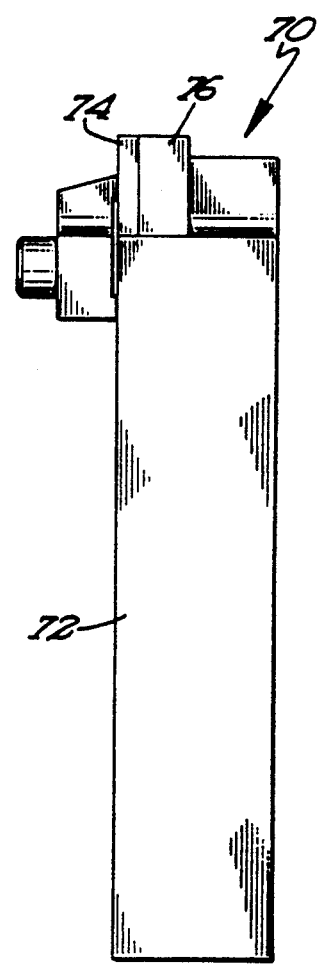
FIG. 13 is a side view of another variation of the instant invention.

Note that in such a product, while there may be a non-zero relief angle 36a on cutting member 34, the relief angles shown on pad 42 and shank 32 can be zero if desired. In other words, with the instant invention, there is no need for a relief angle on these parts. While FIGS. 5-7 show a zero relief angle on all parts, this is because the figures show a blank, that is, a tool which has not had the form machined yet. FIGS. 8 and 9 show the relief angle.

FIGS. 8 and 9 show a variation 50 of the instant invention wherein at least a portion of the distal edge 52a of shank 52 extends outwardly beyond the cutting edge 54a of cutting member 44 and the distal edge 62a of pad 62 thereby locating cutting edge 54a between distal edge 52a and mounting end 52b. This allows enhanced versatility wherein the part 64 being machined actually sets "in" the cutting tool that is, within the nominal outline of the tool as formed by extension of its boundaries.

FIGS. 8 and 9 actually show a form tool with a real type profile. For purposes of illustration, FIGS. 1-7 show "blanks" of the various parts before machining to cut a particular profile. Note that with the instant invention, the shank need never be cut for a particular profile and has a simple right angle end. Only the pad and cutting member need be profiled with only the cutting member having a relief angle.

Similarly, as shown in the embodiments 70 and 80 FIGS. 10-13, the cutting member (84 in FIGS. 10 and 11 and 74 in FIGS. 12 and 13) and pad (76 in FIGS. 10 and 11 and 86 in FIGS. 12 and 13), while usually the same width as one another, may be either wider or narrower than the shank (72 in FIGS. 10 and 11 and 82 in FIGS. 12 and 13) with which they are used. This allows a very small number of shanks to be used with a variety of parts thereby cutting down substantially on the cost of the tools and the need for space to store the tools when not in use. Again, as can be seen, the pad is generally provided with a straight edge and not a relief angle and is generally set back at least 0.005 inches.

As can also be seen, the distal edge 52a of shanks 32, 52, etc. is straight across and does not necessarily follow the shape of the cutting edge as is common with prior art. Again, this allows standard shanks to be used with any variety of tool shapes.

It is appreciated that the shank can be almost anything in addition to the standard shapes and can even conceivably be the tool holder for a CNC machine or the like.

Of course, the system of the instant invention allows standard carbide and pad blanks to be utilized to form any number of different tool designs. The thickness of the pad depends on the use to which it will be put but it should provide support and should also be thick enough to provide sufficient clearance between the part in the shank for the geometry being machined.

It is contemplated that various changes and modifications may be made to the form tool system without departing from the spirit and scope of the invention as defined by the following claims.

What is claimed is:

1. A form tool for machining parts, said tool comprising:
   a shank comprising a width, a mounting end and a distal end;
   a form cutting member having a width, a top surface, and a cutting edge,
   a pad, said pad being sandwiched between said shank and said cutting member and having a width and a distal edge relatively close to and parallel to said cutting edge, said pad alone having a thickness and shape which combine to support said cutting member during machining, said shank having a distal end shape different from that of said form cutting member; and
   means for securing said cutting member and said pad to said shank.

2. The from tool for machining parts of claim 1 wherein at least a portion of said cutting edge is located intermediate said distal end and said mounting end.

3. The form tool for machining parts of claim 1 wherein said pad distal edge and said cutting edge are offset from said distal end.

4. The form tool for machining parts of claim 1 wherein said cutting member width and said pad width are approximately equal to one another.

5. The form tool for machining parts of claim 4 wherein said cutting member width and said pad width are less than said shank width.

6. The form tool for machining parts of claim 4 wherein said cutting member width and said pad width are greater than said shank width.

7. The form tool for machining parts of claim 1 further comprising a plurality of differently shaped and sized interchangeable pads and cutting members.

8. The form tool for machining parts of claim 1 wherein said securing means also functions as a chip breaker.

9. The form tool for machining parts of claim 1 wherein said pad comprises a zero degree relief angle, said relief angle being measured relative to a plane located generally parallel to said cutting edge and perpendicular to said top surface.

10. The form tool for machining parts of claim 1 wherein said shank comprises a zero degree relief angle, said relief angle being measured relative to a plane located generally parallel to said cutting edge and perpendicular to said top surface.

11. The form tool for machining parts of claim 1 further comprising:
    tabs on said pad and said cutting member; and
    a slot in said shank, said tabs being located in said slot.

12. The form tool for machining parts of claim 1 wherein said shank comprises a relief angle different from the relief angle of said insert, said relief angle being measured relative to a plane located generally parallel to said cutting edge and perpendicular to said top surface.

13. The form tool for machining parts of claim 1 wherein said pad comprises a relief angle different from the relief angle of said insert, said relief angle being measured relative to a plane located generally parallel to said cutting edge and perpendicular to said top surface.

* * * * *